United States Patent
Singer

(10) Patent No.: US 9,197,591 B2
(45) Date of Patent: Nov. 24, 2015

(54) METHOD AND SYSTEM FOR VALIDATING EMAIL FROM AN INTERNET APPLICATION OR WEBSITE

(71) Applicant: Brian Singer, Reisterstown, MD (US)

(72) Inventor: Brian Singer, Reisterstown, MD (US)

(73) Assignee: JustEmailUs, LLC, Owings Mills, MD (US)

( * ) Notice: Subject to any disclaimer, the term of this patent is extended or adjusted under 35 U.S.C. 154(b) by 251 days.

(21) Appl. No.: 13/751,287

(22) Filed: Jan. 28, 2013

(65) Prior Publication Data

US 2013/0332544 A1    Dec. 12, 2013

Related U.S. Application Data

(60) Provisional application No. 61/657,370, filed on Jun. 8, 2012.

(51) Int. Cl.
*G06F 15/16* (2006.01)
*H04L 12/58* (2006.01)

(52) U.S. Cl.
CPC .............. *H04L 51/28* (2013.01); *H04L 51/12* (2013.01)

(58) Field of Classification Search
CPC ....... H04L 12/28; H04L 12/585; H04L 51/12; H04L 51/28; G06Q 10/107; G06F 17/30867
See application file for complete search history.

(56) References Cited

U.S. PATENT DOCUMENTS

| | | | |
|---|---|---|---|
| 5,987,508 A | 11/1999 | Agraharam et al. | |
| 6,389,455 B1 | 5/2002 | Fuisz | |
| 6,438,583 B1 | 8/2002 | McDowell et al. | |
| 6,591,291 B1 | 7/2003 | Gabber et al. | |
| 6,608,888 B2 | 8/2003 | Bedingfield et al. | |
| 6,973,481 B2 | 12/2005 | MacIntosh et al. | |
| 7,054,906 B2 | 5/2006 | Levosky | |
| 7,302,471 B2 | 11/2007 | Hall | |
| 7,305,445 B2 | 12/2007 | Singh et al. | |
| 7,447,756 B2 | 11/2008 | Malik | |
| 7,558,827 B2 | 7/2009 | Kawashima et al. | |
| 7,580,982 B2 * | 8/2009 | Owen et al. | 709/206 |
| 7,617,284 B2 | 11/2009 | Salamuniccar | |
| 7,636,716 B1 * | 12/2009 | Cheng | 707/999.102 |
| 7,783,741 B2 | 8/2010 | Hardt | |
| 7,860,931 B2 | 12/2010 | Yabe et al. | |
| 8,606,860 B2 * | 12/2013 | Chang et al. | 709/206 |
| 2002/0087647 A1 * | 7/2002 | Quine et al. | 709/206 |
| 2002/0129111 A1 | 9/2002 | Cooper | |
| 2003/0236847 A1 * | 12/2003 | Benowitz et al. | 709/206 |
| 2005/0201536 A1 | 9/2005 | LaLonde et al. | |
| 2005/0204011 A1 | 9/2005 | Velayudham | |

(Continued)

*Primary Examiner* — Liangche A Wang
*Assistant Examiner* — Ayele Woldemariam
(74) *Attorney, Agent, or Firm* — Larry J. Guffey; Oliver & Grimsley, LLC

(57) ABSTRACT

An improved method for controlling a computer device user's email accessibility to an email receiver includes the steps of: (a) providing software configured to generate a unique email address link for use by the email sender, (b) configuring this email address link to include code that causes any email message created by the email sender to have included within it a token which identifies the email sender and causes the email server handling this message to communicate with the server on which the software is running for the purpose of receiving authorization from this server as to whether to deliver the email message to its intended receiver, and (c) establishing a set of rules which seeks to restrict the email message of spammers from being authorized for delivery to the email receiver.

16 Claims, 2 Drawing Sheets

(56) References Cited

U.S. PATENT DOCUMENTS

| | | |
|---|---|---|
| 2008/0052364 A1 | 2/2008 | Zhou |
| 2008/0052396 A1* | 2/2008 | Tell et al. .................... 709/226 |
| 2008/0256201 A1 | 10/2008 | Flowers et al. |
| 2012/0209699 A1* | 8/2012 | Cochran et al. ............ 705/14.49 |

* cited by examiner

METHOD AND SYSTEM FOR VALIDATING EMAIL FROM AN INTERNET APPLICATION OR WEBSITE

CROSS-REFERENCE TO RELATED APPLICATION

This patent application and claims the benefit of Provisional Patent Application No. 61/657,370 which was filed on Jun. 8, 2012 by the present inventor. The teachings of this earlier application are incorporated herein by reference to the extent that they do not conflict with the teachings herein.

BACKGROUND OF THE INVENTION

1. Field of the Invention

The present invention relates generally to the field of creating, displaying and processing email. More specifically, the present invention provides an improved method and system for preventing spam email from reaching an email receiver's inbox.

2. Description of the Related Art

Computer networks are pervasive and have become a part of everyday life. They are used by individuals, companies, and other entities as a means for storing, retrieving, delivering, and displaying information of all kinds. Networks enable users to connect to websites, internal networks, internet-based applications, and each other via a myriad of devices including desktop computers, mobile phones, smart phones, and tablet devices, to name a few.

A website is a good example of the use of networks. Users can connect to a website of a content provider via, for example an internet connection, and gain access to all of the information made available by the content provider. Frequently the content provider may be using the website to advertise goods and/or services it (or a person or entity contracting with the content provider) provides to users, and in doing so, the content provider may want to provide identification information (address, telephone numbers, email addresses, etc.) so that a user may follow up, after viewing the website, to connect with the content provider (for the person or entity contracting with the content provider to advertise their goods/services) to ask questions and/or make a purchase.

A problem exists, however, with providing this kind of identification information via a website or other network location. Malicious users, e.g. spammers, frequently "harvest" identification information, particularly email addresses, from such locations and then use the email addresses to send unsolicited offers, advertisements, or other types of spam to the harvested email addresses. The malicious users typically employ software applications called "web robots" or, more simply, "bots" or "spambots," to automatically perform the harvesting function. The spambots can run twenty four hours a day with little or no human intervention and simply troll the web hour after hour collecting email addresses and other identification information useful to the spamming community. This practice results massive administrative problems for persons whose identification information has been obtained in this way and is very costly to them in terms of both time and money.

The current best practice for dealing with this situation is for the website/content provider to employ a challenge-response system which requires some form of human input for one to be given access to the identification information. A CAPTCHA (Completely Automated Public Test to Tell Computers and Humans Apart) program is an example of one such system, which provides a "test" that is, in theory, simple for a human to solve but difficult for a computer to solve. Typically, for example, a CAPTCHA system might present a user with a distorted image of words and ask the user to type the words into an answer box. While such a system is moderately successful, it is burdensome for the user, particularly as spambots are programmed to try to identify the wording in spite of the distortion. The distortion used has become more pronounced, making it more difficult not only for the spambots to identify the text, but also for the human user.

What is needed, then, is a system and method enabling the safe display of identification information, such as email addresses, on websites and other network-accessible locations that is easy to use, and minimizes or halts completely the need for persons legitimately accessing the information to perform additional steps to safely gain this identification information.

SUMMARY OF THE INVENTION

Recognizing the need for the development of an improved method and system for validating email from an internet website or application, the present invention is generally directed to overcoming the problems and disadvantages exhibited by the existing methods which try to eliminate spam emails from reaching an email receiver's inbox.

According to the present invention, an improved method, in an environment of networked computing devices which include a server, for controlling a computer device user's email accessibility when the email messages that are to be controlled are of the type that: (i) are coming from an email sender who utilizes an email address link that the email sender has acquired on the network, (ii) depend on the email program of the email sender using this email address link to generate an email message which is subsequently sent to an email server that is capable of delivering the email message to the email receiver, includes the steps of:

(a) providing software configured to run on said networked server, to generate a unique email address link for use by an email sender, to create a database on said networked server, and, upon receiving a request by someone for the email address link, to collect and store in the database information that identifies the email sender and the date and time when the request was made for the email address link, (b) configuring this email address link to include code that causes any email message created by the email sender to have included within the email message a token that is configured so as to identify the email sender, (c) configuring further the code included in the email address link so as to cause the email message generated by the email program of the email sender to cause the email server which handles this email message to communicate with the server for the purpose of receiving authorization from the server to deliver the email message, (d) establishing a set of rules which utilize the database information to determine whether an email message having one of the included tokens will be authorized for delivery to the email receiver, (e) applying, upon receipt of the email delivery determination communication from the email server, the rules and database information to determine whether the email message is authorized for delivery to the email receiver, and (f) communicating the email delivery determination to the email server so as to provide for the delivery of the email message to its receiver.

The present invention can further be configured so that its email delivery rules include the requirement that the information on the identity of the email sender be checked against specified criteria established to identify email spammers and that the email messages of such an identified email spammer not be authorized for delivery to its designated email receiver.

Additionally, the present invention can be configured so that the invention's token contains information on the date and time when the request is made for the email address link, and the invention's rules configured so that they include the requirement that email not be delivered if the duration of time, between when the request for the email address link is received and when the server receives the email server communication seeking authorization to deliver the email message, exceeds a specified time period.

The present invention is seen to be especially well suited for situations when: (1) its email address link appears on a webpage that the email sender accesses by requesting access to the webpage from the content provider of the webpage and the content provider responds by generating a version of the webpage for the email sender that includes a unique email address link, and wherein this webpage request contains information regarding the identity of the email sender and the date and time of the request to access the webpage, and, alternatively, (2) the computer device is a smart phone and the request for the email address link is generated by an application running on the smart phone.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Figure 1:
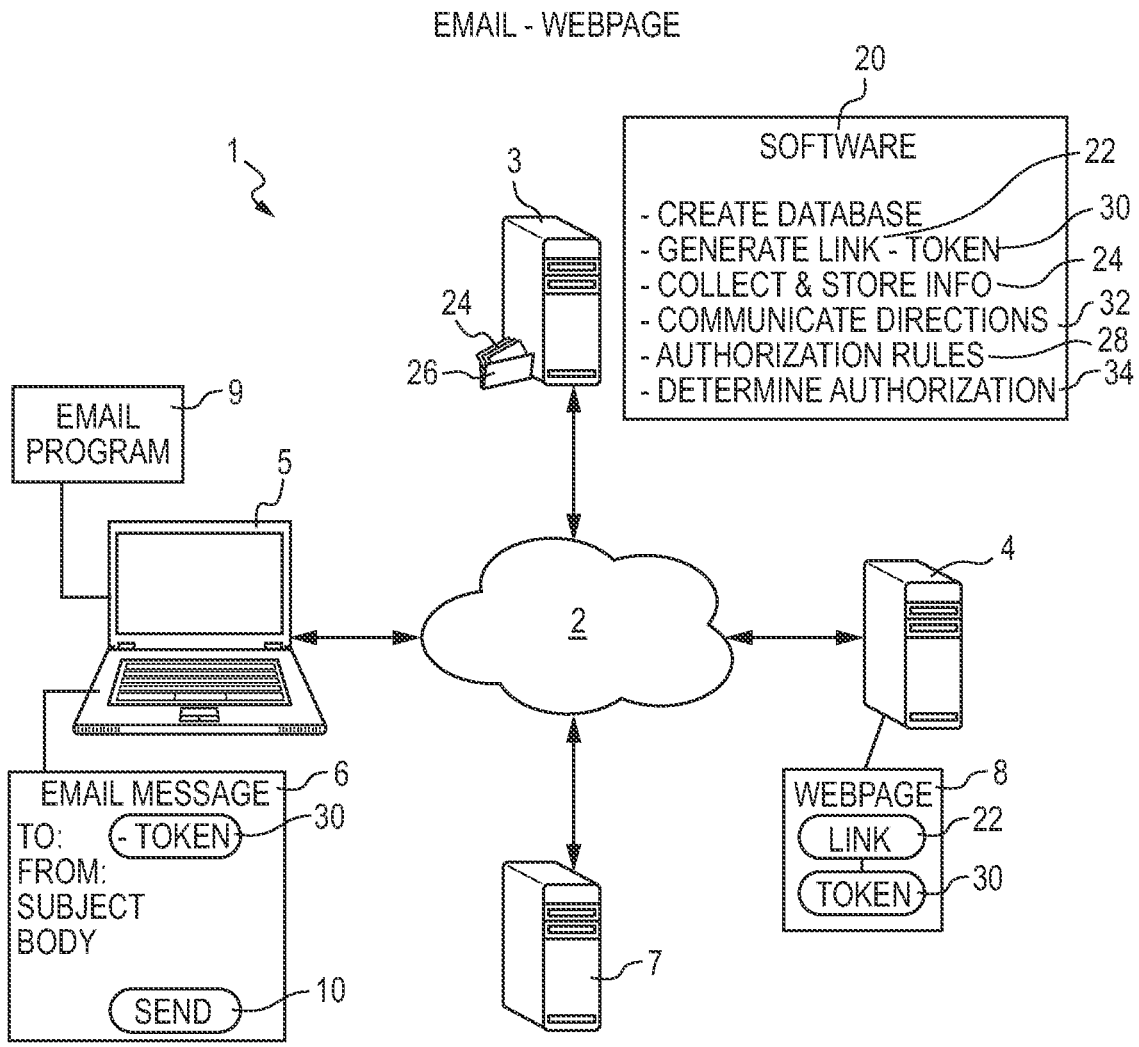
FIG. 1 is a block diagram illustrating the general architecture of a system of the claimed invention.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The apparatus or system and method of the present invention 1 creates software 20 that can operate on a server that is part of a network 2 in an "Enterprise version" (fully operates on the content provider's web and email server) or in an "API version" (operates on a third party's server 3). Each version uses the same basic technique. The API version works directly with a content provider's web server 4. The Enterprise version is intended to be licensed for use on the content provider's web server and enables simpler administration for the Enterprise version administrator, including compliance with internal "regulations" (e.g., auto-archiving, password protection).

The invention architecture is described generally in connection with FIG. 1, which shows what we'll refer to herein as an email-webpage embodiment of the present invention (email—because that which is being protected from spammers is email address, and webpage—because the means to access this email address is via a webpage). We present this embodiment in the context of the API version described above. However, it is understood that the same general procedures are applied in the Enterprise version. This application assumes that the reader has a basic understanding of how websites, emails, email servers and HTML operate.

FIG. 1 is a diagram illustrating the general architecture of the present invention. Referring to FIG. 1, a user or email sender connects to a network 2 (e.g., the Internet or other network connection) via a computer or processing device 5 such as a laptop, desktop PC, mobile telephone, smart phone, etc. Also connected to the network 2 is the one who is practicing the present invention, and whom we'll call a third party and who is connected via a server, which we'll herein refer to as the third party or authorization server 3, on which is running the software 20 of the present invention. A content provider a website) connects to the network via a content server 4. The network over which email messages 6 are to be sent also includes an email server 7.

In this illustration, the third party provides the improved service according to the claimed invention. The content provider (and other similar content providers) enters into a subscription-type of agreement with the third party to provide the service.

As described in more detail below, the present invention is configured so that when the user or prospective email sender seeks to access a webpage 8 or website or other content provided by the content provider, if the content provider is a subscriber to the service, the request sent by the user will allow a determination to be made as to whether or not the particular user making the request is a person or entity that is approved to receive the protected identification information (e.g., an improved and unique email address link 22 that enables an email sender to compose an email message 6 that will be received by an email receiver who is utilizing the present is invention to screen out spammers). Processes are implemented to confirm that this is (or is not) the case and then, if appropriate, the protected identification information is released/delivered to the user.

Figure 2:
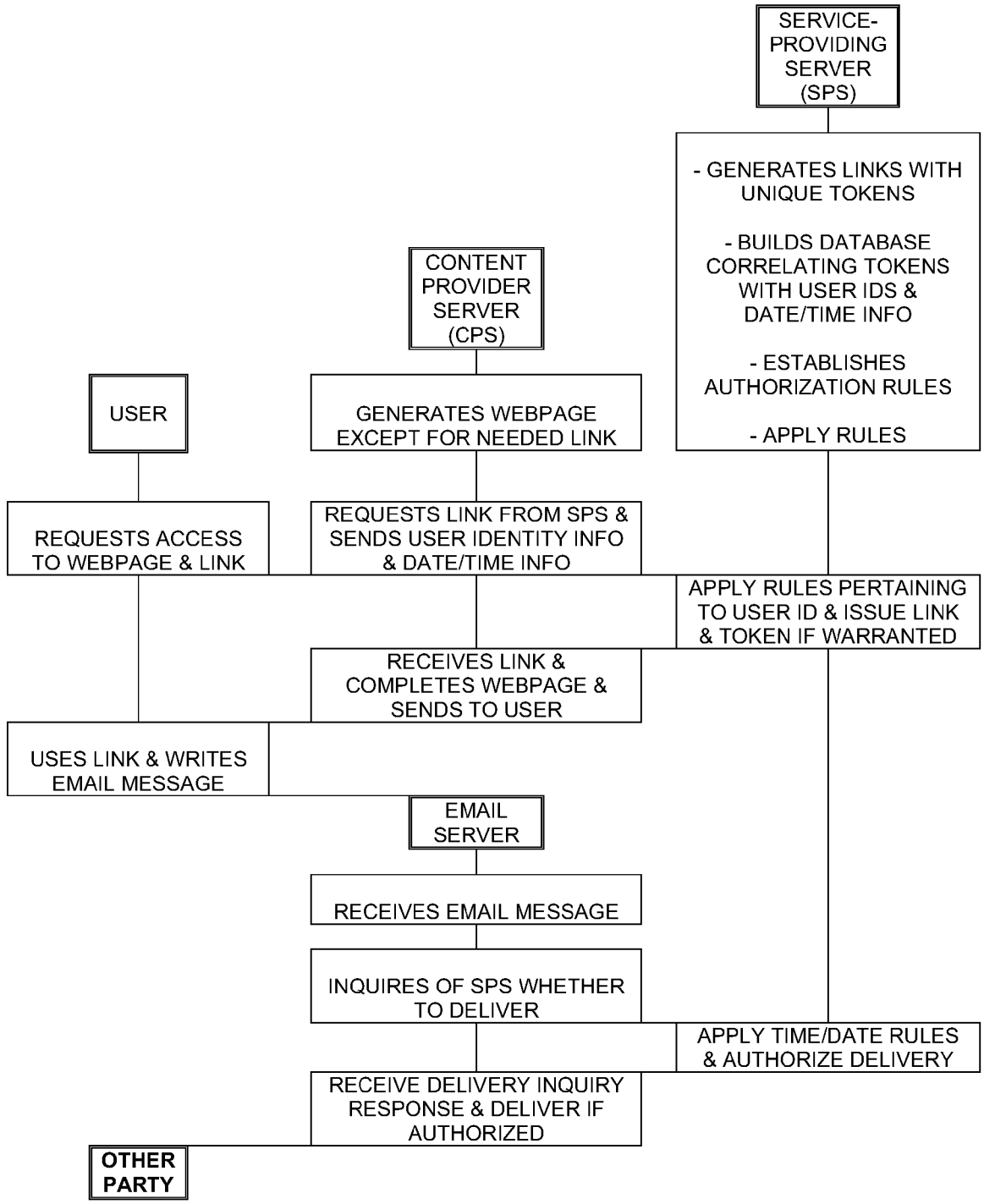
FIG. 2 is a flow diagram illustrating an example of the general flow and process steps associated with the present invention.

Referring now to FIG. 2 which shows the key steps in the process of the present invention and groups them in columns according to which party or server is performing them. The process begins when the user accesses the webpage 8 of the content provider. In a typical example, the user might be looking for contact information (email address, telephone numbers, etc) which will allow the user to communicate directly with an individual or department of the content provider. In this example, it is presumed that the user wants to get an email address link to communicate with the content provider (e.g., an internet retailer) and so the user sends a request to the content provider for a webpage 8 that includes the desired. email address link (e.g., by clicking on a "contact us" tab).

The content provider, who is assumed to be cooperating with the service provider of the present invention and in communication with its authorization, host or third party server 3, utilizes the content provider's server 4 to generate the requested webpage using a unique element 22 (e.g., a novel email address link or a snippet of code inserted into the website) that is created on host server 3 and sent to the content provider's server 4 if certain conditions or requirements of the present invention are met.

In order for this element 22 to be created, the software 20 of the present invention causes a number of things to happen both on the host server 3 on which on the software is running and on the server 4 of the control provider.

For example, the content provider's server sends the user's or prospective email sender's IP address or other identifying information 24 to the third party or host server 3 for use in a database 26 that is created by the software of the present invention for the purpose of spam control. The software 20 of the present invention also causes the date and time 28 of the receipt of the user's identifying information 24, or the date and time that a user requests access to the webpage, to be noted in its database 26. The IP address is part of the original request from the user and thus the content provider knows it.

At the host server, a determination is made by the third party as to whether or not the content provider who is seeking the needed email address link 22 is a subscriber (registered user) to the services of the present invention. For example, when a "handshake" with the API is attempted, in order to receive it the API will have to authenticate the content provider (e.g., via password or by the IP address of the requestor). If it is determined that the content provider is not a subscriber, an error code is returned and the request is denied.

Upon the creation at the host server 3 of the database entry to capture and store the requestor's identifying and date/time information, the software of the present invention causes the generation of a random unique identifier or token 30 that is to accompany the email address link 22 if certain criteria or rules 28 of the software of the present invention are met.

For example, the rules 28 of the present invention can be used to check the user's IP address against other captured and stored database entries. Based on these rules, the request for the token may be denied if, for example, the same IP address has made requests beyond a predetermined total number and/or above a predetermined temporal rate. Other known triggers or rules identifying spammers can also be used to deny requests (e.g., "Deny deliver if: the IP address of the sender is from an undesirable country). The results of the application of these rules 28 are referred to as email delivery determinations since an email message with the required token will not be delivered by any email server which handles it.

Assuming these determinations are positive, the requested novel email address link 22 with its embedded token 30 is transmitted to the webserver 4 of the content provider to be displayed on the webpage 8 that is delivered to the user or prospective email sender. The email link 22 displayed to the user will be a typical HTML link, but it will automatically fill-in the present invention's token 30 as part of either the email's message subject line or message body. The user will simply use the email program 9 on his or her computer device 5 to type their email message 6 into the email body as per usual practice.

A user then clicks on a send link 10 connected to the email message to have the user's email program 9 send the email message to the appropriate email server 7. The presence of the token in this message causes the email server 7 handling this email message to send it to the authorization server 3.

Upon receipt by the host server, the token 30 in the email is checked to determine if it is active and unused—for example, the token 30 will typically have been set to expire at a predetermined time specified by the content provider (e.g., this requirement or rule 28 could entail an email message 6 not be delivered if the duration of time, between when the request for the email address link 22 is received and when a communication from an email server 7 is received seeking authorization to deliver the email message, exceeds a specified time period). If the token has expired, or if there is no token or the token has been used, the email server is directed to deny deliver of the email message.

The content provider may opt to send an autoreply to the user advising them of the denial of the sending the email message. If the token is in the email, and is valid and unused, the software of the present invention causes a message to be sent to the email server to deliver or forward this email message to the email inbox of the email receiver who has chosen to employ the novel services provided by the present invention.

It should be recognized that the present invention is applicable to a wide assortment of situations in which a user may be attempting to originate and send an email message other than by just getting one's email address off a webpage. For example, a smart phone or other computer device may have installed on it an application which can initiate an email message by reaching out over a network to get a required link of information. In this situation, they third party server discussed above would be available to provide this necessary link 22 with its embedded token 30. The third party's authorization step would then also be conducted as generally described above to prevent spammers from initiating emails in this and similar manners.

Additionally, it should be noted that the present invention is applicable to protecting from communications over networks items of one's contact or confidential information other than just one's email address. These applications all involve having a third party or service-providing server in the network generating a unique token 30 that identifies the user and then having the service-providing third party cooperate with servers on the network that enable the network's communications so as to allow an authorization process to be conducted by the third party when the user's communication occurs and due to token's presence in the communication. The generalized steps that the software applicable in any of these applications must perform include:

generating the required link, creating a database into which is collected and stored information that identifies the user and the date and time when a request is made for such a link, configuring the link to include code that causes any communication created by the user using the link to have included within the resulting communication a token that is configured so as to uniquely identify the user and cause the communication generated by the user, when it is received by a communication-enabling server, to have this server communicate with the service-providing server for the purpose of receiving authorization as to whether or not to deliver the communication to the other party, establishing a set of rules which utilize said database information to determine whether a communication having one of the included tokens will be authorized for delivery to the other party, applying, upon receipt of the delivery authorization inquiry, these rules and database information to determine whether the user's communication is authorized for delivery to the other party, and communicating this authorization determination to the communication-enabling server so as to provide for the delivery of the communication to the other party.

The above-described steps and elements can be implemented using standard well-known programming techniques. The novelty of the above-described embodiment lies not in the specific programming techniques but in the use of the steps and elements described to achieve the described results. Software programming code which embodies the present invention is typically stored in permanent storage. In a client/server environment, such software programming code is may be stored with storage associated with a server.

The software of the present invention may be embodied on any of a variety of known media for use with a data processing system, such as a diskette, or hard drive, or CD-ROM. It may he distributed on such media, or may he distributed to users from the memory or storage of one computer system over a network of some type to other computer systems for use by users of such other systems. The techniques and methods for embodying the software of the present invention on physical media and/or distributing it via networks are well known and will not be further discussed herein.

It will be understood that each element disclosed in this application's FIGS., and combinations of elements in them, can be implemented by general and/or special purpose hardware-based systems that perform the specified functions or steps, or by combinations of general and/or special-purpose hardware and computer instructions.

The program instructions of the present invention may be provided to a processor to produce a machine, such that the instructions that execute on the processor create means for implementing the functions disclosed herein. The computer program instructions may be executed by a processor to cause a series of operational steps to be performed by the processor to produce a computer-implemented process such that the instructions that execute on the processor provide steps for implementing the functions specified in this application's FIGS. Accordingly, these FIGS. support combinations of means for performing the specified functions, combinations of steps for performing the specified functions, and program instruction means for performing the specified functions.

The foregoing is considered as illustrative only of the principles of the present invention. Further, since numerous modifications and changes will readily occur to those skilled in the art. It is not desired to limit the invention to the exact construction and operation shown and described herein. Accordingly, all suitable modifications and equivalents may be resorted to, falling within the scope of the invention that are set forth in the claims to the invention.

I claim:

1. An improved method that is performed by a subscription-service provider, in an environment of networked computing devices which include a server operated by said subscription-service provider, for controlling a computer device user's or email sender's accessibility to an intended email recipient and service subscriber who wants to screen out spammers from using an email address link that appears on a webpage of said intended email recipient and, when said email sender requests access to said webpage, said service provider responds by providing a version of said webpage that contains a unique version of said email address link for said email sender that enables an email program of said email sender to generate an email message from said email sender to said intended email recipient and then send said email message to an email server that is capable of delivering said email message to said intended email recipient, the improvements to said method comprising the steps of:

providing software configured to: (a) run on said server of said subscription-service provider, (b) generate a unique email address link that does not require said email sender to perform any actions, other than requesting said access to said webpage with said email address link of said intended email recipient, in the generation of said unique email address link which appears on said version of said webpage of said intended email recipient, (c) create a database on said server of said subscription-service provider, and, (d) upon receiving said request for access to said webpage, with said email address link of said intended email recipient, from said email sender, collect and store in said database information from said email sender that identifies said email sender and the date and time when said request, for access to said webpage with said email address link of said intended email recipient, was made, and wherein said information collection and storage steps do not require said email sender to perform any additional actions, configuring said unique email address link in said requested webpage to include a token that has a configuration adapted to uniquely identify said email sender and which for said identification does not require said email sender to perform any actions other than requesting said access to said webpage with said email address link of said intended email recipient, configuring further said token so as to cause said email message generated by the email program of said email sender, when received by said email server, to have said email server communicate with said server of said subscription-service provider for the purpose of receiving authorization from said server of said subscription-service provider to deliver said email message to said intended email recipient, and wherein said authorization is achieved without requiring said email sender to perform any actions other than requesting said access to said webpage with said email address link of said intended email recipient, establishing a set of rules that are configured for use by said server of said subscription-service provider and which utilize said database information to determine whether said email message having one of said included tokens will be authorized for delivery to said intended email recipient, applying said set of rules to determine whether said email message of said email sender is authorized for delivery to said intended email recipient, and communicating said email delivery determination to said email server so as to provide for the delivery of said email message to said intended email recipient.

2. The improved method as recited in claim 1, further comprising the step of:

configuring said set of rules to include the requirement that said information on the identity of said email sender be checked against specified criteria established to identify email spammers and that the email messages of such identified email spammers not be authorized for delivery to said intended email recipient.

3. The improved method as recited in claim 2, further comprising the step of:

further configuring said token so that said token contains information on the date and time that said request is made for access to said webpage, and configuring said set of rules to include the requirement that said email not be delivered if the duration of time, between when said request for access to said webpage is received and when said server of said subscription-service provider receives email server communication seeking authorization to deliver said email message, exceeds a specified time period.

4. The improved method as recited in claim 3, wherein:

said computer device is a smart phone and said request for access to said webpage is generated by an application running on said smart phone.

5. The improved method as recited in claim 2, wherein:
said computer device is a smart phone and said request for access to said webpage is generated by an application running on said smart phone.

6. The improved method as recited in claim 1, further comprising the step of:
further configuring said token so that said token contains information on the date and time that said request is made for access to said webpage, and
configuring said set of rules to include the requirement that said email not be delivered if the duration of time, between when said request for access to said webpage is received and when said server of said subscription-service provider receives email server communication seeking authorization to deliver said email message, exceeds a specified time period.

7. The improved method as recited in claim 6, wherein:
said computer device is a smart phone and said request for access to said webpage is generated by an application running on said smart phone.

8. The improved method as recited in claim 1, wherein:
said computer device is a smart phone and said request for access to said webpage is generated by an application running on said smart phone.

9. A non-transitory, computer-readable storage medium storing instructions that, when executed, enable a networked server operated by subscription-service provider to control a computer device user's or email sender's accessibility to an intended email recipient and service subscriber who wants to screen out spammers from using an email address link that appears on a webpage of said intended email recipient and, when said email sender requests access to said webpage, said service provider responds by providing a version of said webpage that contains a unique version of said email address link for said email sender that enables an email program of said email sender to generate an email message from said email sender to said intended email recipient and then send said email message to an email server that is capable of delivering said email message to said intended email recipient, said instructions on said medium comprising the steps of:
generating a unique email address link that does not require said email sender to perform any actions, other than requesting said access to said webpage with said email address link of said intended email recipient, in the generation of said unique email address link which appears on said version of said webpage of said intended email recipient,
creating a database on said server of said subscription-service provider,
upon receiving said request for access to said webpage, with said email address link of said intended email recipient, from said email sender, collect and store in said database information from said email sender that identifies said email sender and the date and time when said request, for access to said webpage with said email address link of said intended email recipient, was made, and wherein said information collection and storage steps do not require said email sender to perform any additional actions,
configuring said unique email address link in said requested webpage to include a token that has a configuration adapted to uniquely identify said email sender and which for said identification does not require said email sender to perform any actions other than requesting said access to said webpage with said email address link of said intended email recipient,
configuring further said token so as to cause said email message generated by the email program of said email sender, when received by said email server, to have said email server communicate with said server of said subscription-service provider for the purpose of receiving authorization from said server of said subscription-service provider to deliver said email message to said intended email recipient, and wherein said authorization is achieved without requiring said email sender to perform any actions other than requesting said access to said webpage with said email address link of said intended email recipient,
establishing a set of rules that are configured for use by said server of said subscription-service provider and which utilize said database information to determine whether said email message having one of said included tokens will be authorized for delivery to said intended email recipient,
applying said set of rules to determine whether said email message having one of said included tokens will be is authorized for delivery to said intended email recipient, and
communicating said email message delivery determination to said email server so as to provide for the delivery of said email message to said intended email recipient.

10. The non-transitory, computer-readable storage medium as recited in claim 9, wherein:
said set of rules are configured to include the requirement that said information on the identify of said email sender be checked against specified criteria established to identify email spammers and that the email messages of such identified email spammers not be authorized for delivery to said intended email recipient.

11. The non-transitory, computer-readable storage medium as recited in claim 10, wherein:
said token further configured so that said token contains information on the date and time that said request is made for access to said webpage, and
said set of rules configured to include the requirement that said email not be delivered if the duration of time, between when said request for access to said webpage is received and when said server of said subscription-service provider receives email server communication seeking authorization to deliver said email message, exceeds a specified time period.

12. The non-transitory, computer-readable storage medium as recited in claim 11, wherein:
said computer device is a smart phone and said request for access to said webpage is generated by an application running on said smart phone.

13. The non-transitory, computer-readable storage medium as recited in claim 10, wherein:
said computer device is a smart phone and said request for access to said webpage is generated by an application running on said smart phone.

14. The non-transitory, computer-readable storage medium as recited in claim 9, wherein:
said token further configured so that said token contains information on the date and time that said request is made for access to said webpage, and
said set of rules configured to include the requirement that said email not be delivered if the duration of time, between when said request for access to said webpage is received and when said server of said subscription-service provider receives email server communication seeking authorization to deliver said email message, exceeds a specified time period.

15. The non-transitory, computer-readable storage medium as recited in claim 14, wherein:
 said computer device is a smart phone and said request for access to said webpage is generated by an application running on said smart phone.

16. The non-transitory, computer-readable storage medium as recited in claim 9, wherein:
 said computer device is a smart phone and said request for access to said webpage is generated by an application running on said smart phone.

\* \* \* \* \*